United States Patent
Kadle et al.

(10) Patent No.: US 7,610,767 B2
(45) Date of Patent: *Nov. 3, 2009

(54) THERMOELECTRICALLY HEATED/COOLED SEAT WITH IMPROVED TRANSIENT RESPONSE USING A PROPORTIONING VALVE

(75) Inventors: Prasad Shripad Kadle, East Amherst, NY (US); Edward Wolfe, IV, Amherst, NY (US); Joseph Pierre Heremans, Troy, MI (US); Donald T. Morelli, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 520 days.

This patent is subject to a terminal disclaimer.

(21) Appl. No.: 11/148,527

(22) Filed: Jun. 9, 2005

(65) Prior Publication Data

US 2005/0257541 A1    Nov. 24, 2005

Related U.S. Application Data

(63) Continuation-in-part of application No. 10/948,348, filed on Sep. 23, 2004, now Pat. No. 7,238,101.

(60) Provisional application No. 60/572,691, filed on May 20, 2004, provisional application No. 60/577,624, filed on Jun. 7, 2004.

(51) Int. Cl.
*F25D 17/04* (2006.01)
*B60H 1/32* (2006.01)
*F25B 21/02* (2006.01)

(52) U.S. Cl. ............... 62/186; 62/244; 62/3.3; 62/3.61

(58) Field of Classification Search .......... 62/186, 62/244, 3.2, 3.3, 3.61, 259.1; 454/120
See application file for complete search history.

(56) References Cited

U.S. PATENT DOCUMENTS

| | | | | |
|---|---|---|---|---|
| 4,573,430 | A | * | 3/1986 | Benson et al. ......... 118/411 |
| 4,759,190 | A | | 7/1988 | Trachtenberg ........... 62/3 |
| 5,924,766 | A | * | 7/1999 | Esaki et al. ......... 297/180.13 |
| 6,079,485 | A | | 6/2000 | Esaki ..................... 165/43 |
| 6,474,072 | B2 | * | 11/2002 | Needham ............... 62/3.2 |
| RE38,128 | E | | 6/2003 | Gallup .................. 62/3.5 |
| 7,238,101 | B2 | * | 7/2007 | Kadle et al. ............ 454/120 |
| 2005/0257531 | A1 | * | 11/2005 | Kadle et al. ............ 62/3.3 |

FOREIGN PATENT DOCUMENTS

WO    WO99/58907    11/1999

* cited by examiner

*Primary Examiner*—Chen-Wen Jiang
(74) *Attorney, Agent, or Firm*—Patrick M. Griffin

(57) ABSTRACT

A thermo-electric device has a seat side and a cabin side for delivering heating and cooling air from a HVAC module to seat passages of a vehicle seat assembly. A selector is included for setting a desired or control temperature $T_{control}$ of the seat assembly. A comparator is included for determining the temperature difference $\Delta T$ between the actual temperature of the seat assembly $T_{seat}$ and the desired or selected temperature $T_{control}$. A controller simultaneously adjusts a proportioning valve and adjusts the electrical current to the thermoelectric device in relationship to one another in response to the temperature difference $\Delta T$.

9 Claims, 5 Drawing Sheets

THERMOELECTRICALLY HEATED/COOLED SEAT WITH IMPROVED TRANSIENT RESPONSE USING A PROPORTIONING VALVE

RELATED APPLICATIONS

This application is a continuation-in-part of application Ser. No. 10/948,348 filed Sep. 23, 2004, now U.S. Pat. No. 7,238,101 which, in turn, claims the benefit of provisional application 60/572,691 filed May 20, 2004 and 60/577,624 filed Jun. 7, 2004.

BACKGROUND OF THE INVENTION

1. Field of the Invention

The subject invention relates to a thermally air conditioned seat assembly in an automotive vehicle by using air from the HVAC system of the vehicle.

2. Description of the Prior Art

The thermal comfort of passengers in a vehicle is conventionally provided by the central heating, ventilation and air conditioning (HVAC) module of the vehicle. The passengers are heated or cooled by convection through the surrounding medium in the interior of the vehicle. More recently, vehicle seating systems have been described that provide for additional heating and cooling of the occupant via a thermoelectrically energized unit incorporated into a vehicle seat, as shown in U.S. Patent. RE038,128. Typically these units consist of one or more thermoelectric (TE) modules, heat exchangers, and fan, and are operated by allowing the fan to blow cabin air over the hot and cold sides of the thermoelectric, resulting in heat being absorbed from the air on the cold side and released to the air on the hot side. The cooled air is directed through or over the seat to the occupant's body surface, whereas the warmed air is rejected into the cabin, for instance under or behind the seat. Because these thermoelectrically climate controlled seats use cabin air as the medium, which generally is initially cold in heating mode and warm in cooling mode, there is necessarily a deliberate transient thermal response of the seating system.

SUMMARY OF THE INVENTION AND ADVANTAGES

The subject invention provides thermally conditioned air to a seat assembly in an automotive vehicle having a HVAC module for supplying heating and cooling air to a cabin vent and is distinguished by exchanging heat with the heating and cooling air from the HVAC module in a thermoelectric device in the ductwork between the HVAC module and the seat assembly, with the thermo-electric device having a seat side and a cabin side and connected electrically to the vehicle electrical system for receiving electrical power. A proportioning valve in the ductwork is movable to various adjusted positions for proportioning air from the HVAC module between the seat side and the cabin side of the thermoelectric device. A controller adjusts the proportioning valve and simultaneously adjusts the electrical power to the thermoelectric device in relationship to one another.

In accordance with this invention, a thermoelectrically heated and/or cooled seat provides for improved transient response by directing, instead of cabin air, air ducted from the main HVAC unit of the vehicle, over the hot and cold sides of the thermoelectric module or modules and optimizes the interrelated characteristics of the HVAC module and the thermo-electric device. The subject invention improves transient climate control, as it is optimized not for maximum efficiency, but rather for maximum cooling power. This approach, as will be shown, requires a different electronic control strategy for the thermoelectric device and the HVAC module. The combination of these factors leads to a thermoelectrically heated and cooled seat with an improved transient response relative to those previously disclosed.

Because the thermoelectric device operates using preconditioned HVAC module air, the temperature range, −7° C.-27° C., of operation is narrower than in known systems, −15° C.-40° C., in the first 2-10 minutes of operation and the average temperature of operation is shifted to a lower temperature (from 27.5° C. to 10° C.).

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
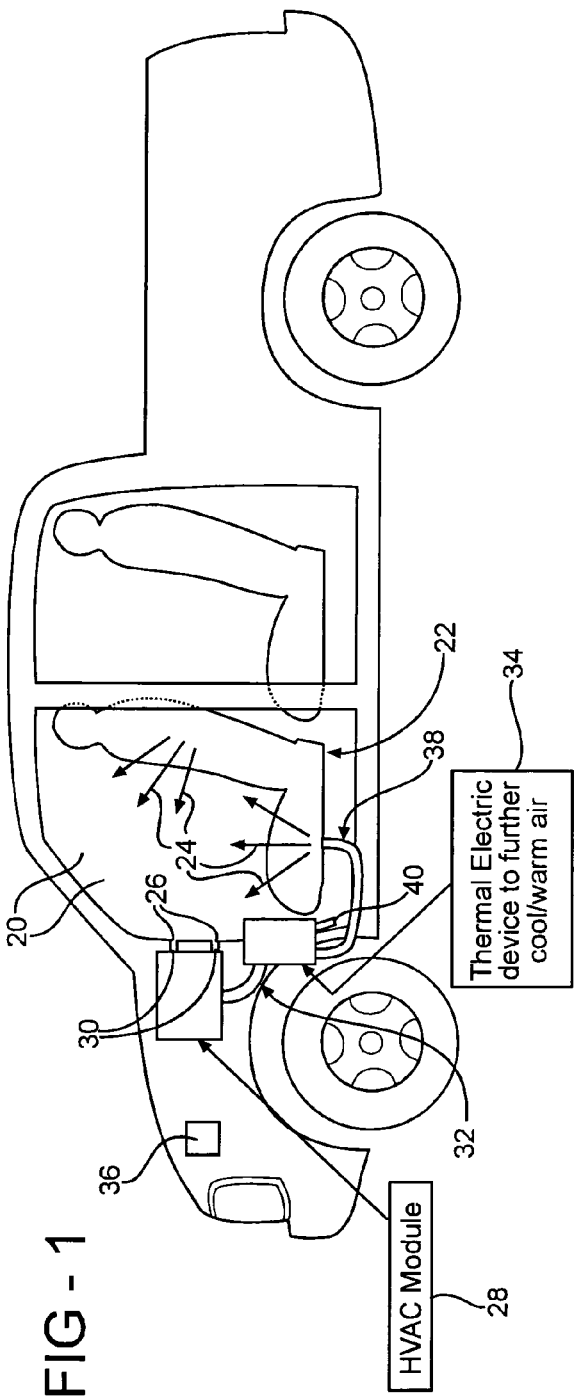
FIG. 1 is a schematic view of an automotive vehicle combined with the thermo-electric device for thermally conditioning a seat assembly in the vehicle.
Figure 2:
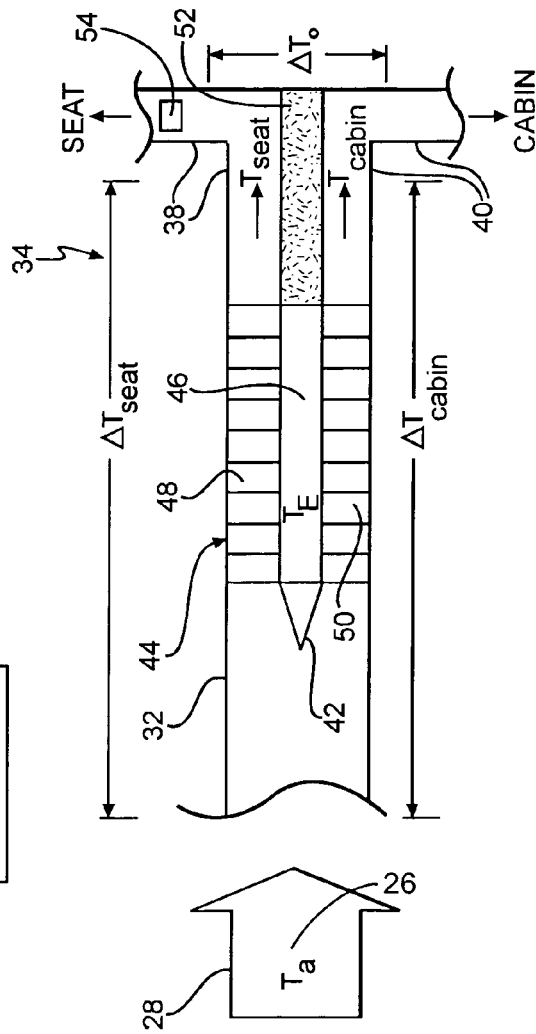
FIG. 2 is a schematic view of the thermo-electric device.
Figure 3:
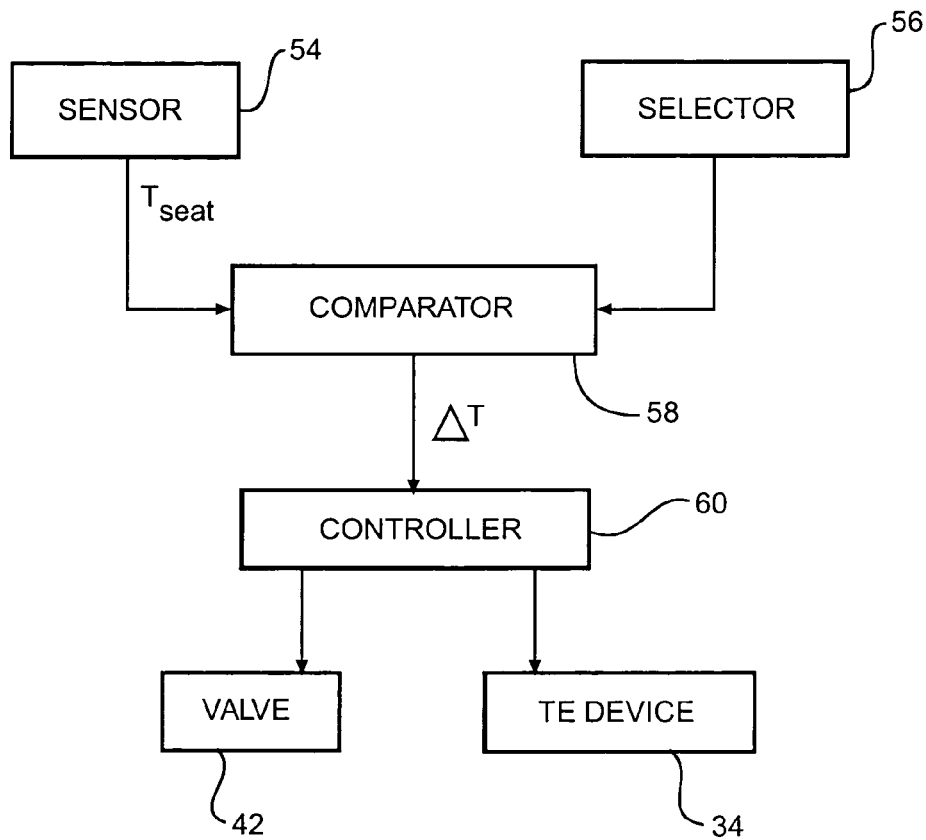
FIG. 3 is a block diagram of the control system for integrating air flow to electrical power to the thermo-electric device.

Referring to the Figures, an automotive vehicle is illustrated in FIG. 1 and an auxiliary air-conditioning device is illustrated in FIG. 2.

The automotive vehicle includes a body defining a passenger cabin 20. A seat assembly 22 is disposed in the passenger cabin 20 and has seat passages 24 for thermally conditioning a seat occupant with air, e.g., the vehicle seat assembly 22 may have a perforated seat cushion that will allow air to pass through.

The passenger cabin 20 has at least one and normally a plurality of cabin vents 26 in the vehicle for conveying air into the passenger cabin 20. A well known HVAC module 28 supplies heating and cooling air and cabin ductwork 30 conveys the heating and cooling air from the HVAC module 28 to the cabin vent 26 and seat ductwork 32 conveys the heating and cooling air from the HVAC module 28 to the seat passages 24 of the seat assembly 22.

An auxiliary air-conditioning device comprising a thermoelectric device 34 is disposed in the seat ductwork 32 for heating and cooling air from the HVAC module 28 for delivery to the seat passages 24 of the seat assembly 22. The vehicle includes an electrical system 36 including a battery and an alternator for supplying electrical power and the thermoelectric device 34 is connected electrically to the electrical system 36 for receiving electrical power there from. The thermo-electric device 34 includes a seat or cool side 38, 40 and a cabin or warm side 38, 40 that include a seat duct for conveying air from the seat side 38 to the seat passages 24 and a cabin duct for conveying air form the cabin side 40 to a cabin vent 26.

As alluded to above, the ductwork 30, 32 includes a HVAC duct for conveying air from the HVAC module 28 to the auxiliary air-conditioning device, and a flow divider or proportioning valve 42, illustrated as a pointed wall, is disposed in the HVAC duct and is movable to various adjusted positions for dividing or proportioning air between the seat side 38 and the cabin side 40 of the auxiliary air-conditioning device from the HVAC module 28. The wall defining the proportioning valve 42 divides air from the HVAC module 28 for passing through the seat side 38 and the cabin side 40.

The auxiliary air-conditioning device includes an overall heat exchanger 44 disposed between the seat side 38 and cabin side 40 for transferring heat therebetween. More specifically, the overall heat exchanger 44 includes a thermoelectric element 46 or module disposed between the seat side 38 and the cabin side 40 with a first heat exchanger 48 on the seat side 38 of the thermoelectric element 46, and a second heat exchanger 50 on the cabin side 40 of the thermoelectric element 46. A thermal insulation 52 is between the seat side 38 and the cabin downstream of the auxiliary air-conditioning device for inhibiting the transfer of thermal energy between the seat side 38 and the cabin side 40.

The auxiliary air-conditioning device may be supported by the seat assembly 22 for efficiency and response time, as discussed below, or mounted in vehicle close thereto via the seat duct being flexible for allowing relative movement between the said seat assembly 22 and the auxiliary air-conditioning device.

The air will be supplied from the HVAC module 28 after a mixing chamber to allow thermally conditioned dry air to enter a set of ductwork 30, 32. The supplied air will then enter the thermoelectric device 34 placed as close as possible to the seat assembly 22, as alluded to above, preferably supported on the seat assembly 22. The placement of the thermal electric device as close as possible to the seat assembly 22 is important to the efficiency of the inventive combination and to minimize the empty or static air between the seat and thermoelectric heat device that would not be conditioned on initial startup of the vehicle.

The current invention supplies conditioned air to the seat assembly 22 at a low flow rate, typically around five to ten percent (5-10%) of the total airflow to each seat at high blower setting and diminishing to one to two percent %-2%) of total airflow to each seat at low blower setting. A typical airflow percentage for each seat is set forth in this table:

TABLE

Typical Seat Airflow Percentages
Percent of Total Airflow Directed Toward Seats

| Blower setting | Driver Seat Airflow | Passenger Seat Airflow |
| --- | --- | --- |
| HI | 5%-10% | 5%-10% |
| M1 | 3.5%-7% | 3.5.%-7% |
| M2 | 1.5%-3% | 1.5.%-3% |
| LO | 1%-2% | 1%-2% |

However, conditioned air from an HVAC module 28 takes time to warm the air depending upon the temperature of the coolant or of the refrigerant. The initial warm-up and cool down can be accelerated as the thermoelectric device operates for the first few minutes, then the HVAC module 28 conditioned air is utilized to comfort the passenger. These modules and devices will work in combination to provide the optimal cooling or heating with minimal electrical power consumption.

The thermoelectric subassembly or device shown in FIG. 2 to supply conditioned air to the heated and cooled seat assembly 22 includes a thermoelectric element 46, seat side 38 and cabin side 40 first heat exchanger 48 and second heat exchanger 50, the ductwork 30, 32, the proportioning valve 42 that sends air flow to the seat side 38 and/or the cabin side 40 of the thermoelectric element 46, and thermal insulation 52 downstream from the overall heat exchanger 44. The air Ta originating from the central HVAC module 28 of the vehicle is propelled through the thermoelectric device by the fan built into the HVAC module 28, the fan of the HVAC module 28 being the sole motivation for moving the conditioned air $T_a$ to the seat assembly 22. A fraction $T_{seat}$ of the air $T_a$ from the HVAC module 28, determined by the proportioning valve 42, or other dividing device, serves to heat or cool the seat, the other fraction $T_{cabin}$ is used to manage the heat load imposed by the thermoelectric element 46 and is dumped into the passenger cabin 20. The seat side 38 and the cabin side 40 of the overall heat exchanger 44 utilize air flows originating from the main HVAC module 28 of the vehicle as opposed to air from the passenger cabin 20. By the use of the appropriate ductwork 30, 32 and thermal insulation 52, a fraction $T_{seat}$ of the preconditioned air Ta from the HVAC module 28 may be directed over the seat side 38 of the overall heat exchanger 44 and to the seat assembly 22, the remaining fraction $T_{cabin}$ being directed over the cold side 38, 40 of the overall heat exchanger 44 and to the passenger cabin 20; these fractions being fixed at an optimum value by the shape of the proportioning fixed proportioning valve 42.

The system also includes a sensor 54 for sensing the actual temperature $T_{seat}$ of the seat assembly 22 by measuring or sensing the temperature of the air exiting the seat side 38.

A selector 56 is included for setting a desired or control temperature $T_{control}$ of the seat assembly 22. The selector 56 is manually set to a desired seat temperature $T_{control}$ selected or controlled by the operator or seat occupant. A comparator or differentiator 58 is included for determining the temperature difference $\Delta T$ between the actual temperature $T_{seat}$ and the desired or selected temperature $T_{control}$. A controller 60 is also included for adjusting the proportioning valve 42 and for simultaneously adjusting the electrical current or power to the thermoelectric device 34 in relationship to one another in response to the temperature difference $\Delta T$.

Figure 7:
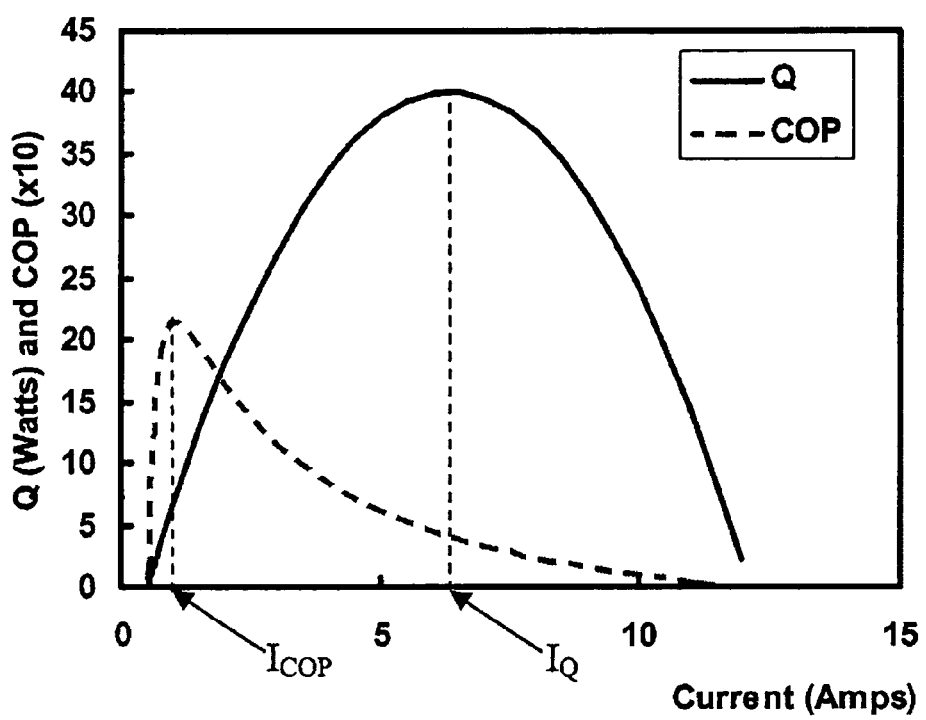
FIG. 7 is a graph of coefficient of performance (COP) and cooling power (Q) as a function of current (I).

In operation, the HVAC module 28 directs pre-cooled (in cooling mode) or preheated (in heating mode) air ($T_a$) from the HVAC module 28 over the seat side 38 and cabin side 40 of the Thermoelectric (TE) device. This TE device, driven by an electrical current I, causes further cooling or heating of the air on the cold side 38, 40 of the TE device, and the heat absorbed from the cold side 38, 40 is pumped to and liberated from the hot side 38, 40 via the hot side 38, 40 of the overall heat exchanger 44. Two important parameters of a TE device are the cooling power Q and the coefficient of performance (or refrigerating efficiency) COP. The efficiency of any cooling system, be it a vapor-compression system or a thermoelectric system, is defined as the Coefficient of Performance (COP), which is, by definition, the amount of heat extracted on the cold side 38, 40 divided by the work (electric energy) required, W: COPC=Qc/W. Cooling power, Q, and coefficient of performance, COP, are a function of the current (I) in the TE device and the seat side 38 and the cabin side 40 temperatures $T_{seat}$ and $T_{cabin}$, respectively. When the auxiliary air conditioning device is in the cooling mode, $T_c=T_{seat}$ and $T_h=T_{cabin}$ and the expressions for COP and Q can be expressed as the following:

$$Q = SIT_C - K\Delta T - \frac{1}{2}I^2 R \qquad (1)$$

and $$COP = \frac{SIT_C - K\Delta T - \frac{1}{2}I^2 R}{I(S\Delta T + IR)} \qquad (2)$$

where S is the thermoelectric power of the thermo-electric device 34 (in units of V/K), K is the module thermal conductance (in W/K), and R is the module resistance (in ohms); $\Delta T = T_H - T_c$. For example, for Tavg=°C=/(Th+Tc), typical values for the thermoelectric parameters (see for instance www-.ferrotec.com) are S=0.053 V/K, K=0.51 W/K, and R=2.4 ohm. The resulting dependencies of Q and COP on I are shown in FIG. 7.

Conventional TE devices are operated such that either the COP, or the cooling power Q is maximized. When optimized for COP, the thermoelectric device 34 TE device is driven at current $I_{COP}$. This results, however, in a very low cooling power. If operated over a short period of time, however, the device may be operated at the current $I_Q$ that maximizes the cooling power. We deduce the value of this current by setting the derivative of equation of Q in (1) with respect to the current I equal to zero, and solving that equation for I, which becomes:

$$I_Q = \frac{ST_C}{R} \qquad (3)$$

Although this higher pumping capacity takes place at a lower COP, the TE device is operated at this current for only a short period of time. After a predetermined time period, the air $T_a$ originating from the vehicle HVAC module 28 has cooled sufficiently that the current I of the TE device may be turned down to $I_{COP}$ to maximize its cooling efficiency.

The main advantage of the series HVAC module 28 and thermoelectric device 34 for seat cooling is that the steady-state cooling can be handled mostly by the HVAC module 28, so that the thermo-electric device 34 can be optimized mainly for maximum cooling power. When operated in this scenario the seat climate control system has an improved transient response relative to a similar system that uses air originating from the passenger cabin 20 for heat exchange.

In the operation of the climate control system, the thermoelectric device 34 is operated initially at a current that maximizes cooling or heating capacity and then, after a predetermined time period, it is operated at a lower current level, thereby improving the transient heating/cooling of the seat relative to a climate control system using cabin air as the heat exchange medium.

Figure 4:
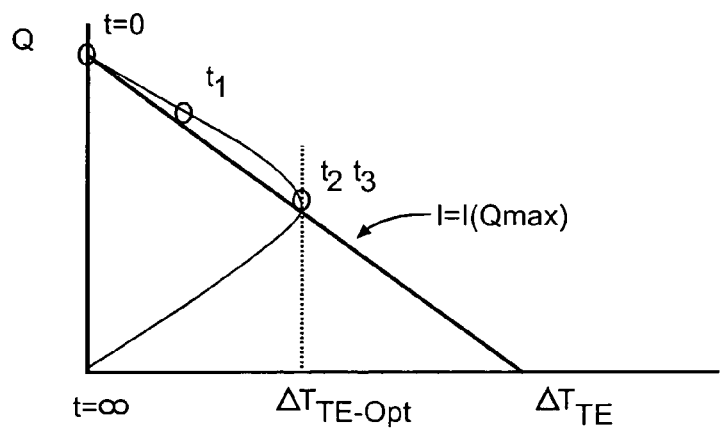
FIG. 4 is a graph of the thermo-electric device load line.

The focus of this invention is controllability of the thermoelectric device 34 based upon conditions within the system during both the transient and steady state conditions. The focus is on maximizing Q by adjusting the proportioning valve 42 for the initial transient conditions ($t_0$-$t_3$), as shown in FIG. 4. The system operates during steady state in response to setting or selecting the control seat temperature, $T_{control}$, equal to a requested comfort level. This is accomplished by first adjusting the position of the proportioning valve 42, and second by modifying current, I, to the thermoelectric device 34. It is required, however, in both heating and cooling to interpret or compare the thermoelectric $\Delta T_{TE}$ and the actual temperature of the seat assembly ($T_{seat}$). These two inputs are utilized to control the transient and steady state conditions of thermoelectric device 34 and seat assembly 22.

FIG. 4 depicts the load line between heat flow (Q) in the thermoelectric device 34 and thermoelectric $\Delta T_{TE}$. It can be seen at time t=0, the Q is maximized and $\Delta T_{TE}$ is minimized. $F_{total}$ is equal to the total airflow from the HVAC module 28 through the thermoelectric device and $F_{seat}$ is equal to airflow through conditioned or seat side 38 of thermoelectric device 34 to the seat assembly 22. Therefore, at startup the thermoelectric device 34 is set at total flow through the seat assembly 22 as $F_{seat}/F_{total}=1$ and I at I ($Q_{max}$). As the thermoelectric device 34 operates through time $t_0$-$t_3$, $\Delta T_{TE}$ increases and Q decreases. The proportioning valve 42 will be operated to determine the maximum Q obtainable. Utilizing a look up table, the Q can be maximized based upon the $\Delta T_{TE}$ and $T_{seat}$. The $\Delta T_{TE}$ can be found utilizing the thermoelectric power of the thermoelectric device 34, S. The thermoelectric power of the thermoelectric device 34, S, will vary for a known thermoelectric material with $\Delta T_{TE}$. Therefore, during initial transients, the Q is maximized by utilizing the $\Delta T_{TE}$ and $T_{seat}$ by varying the proportioning valve 42. As shown in FIG. 4, at time $t_3$, the seat assembly 22 has reached a desired or comfort temperature, $T_{threshold}$, and the thermoelectric current, $1=1_{Qmax}$, should be regulated or turned off completely to maintain the desired $T_{seat}=T_{threshold}$.

Figure 5:
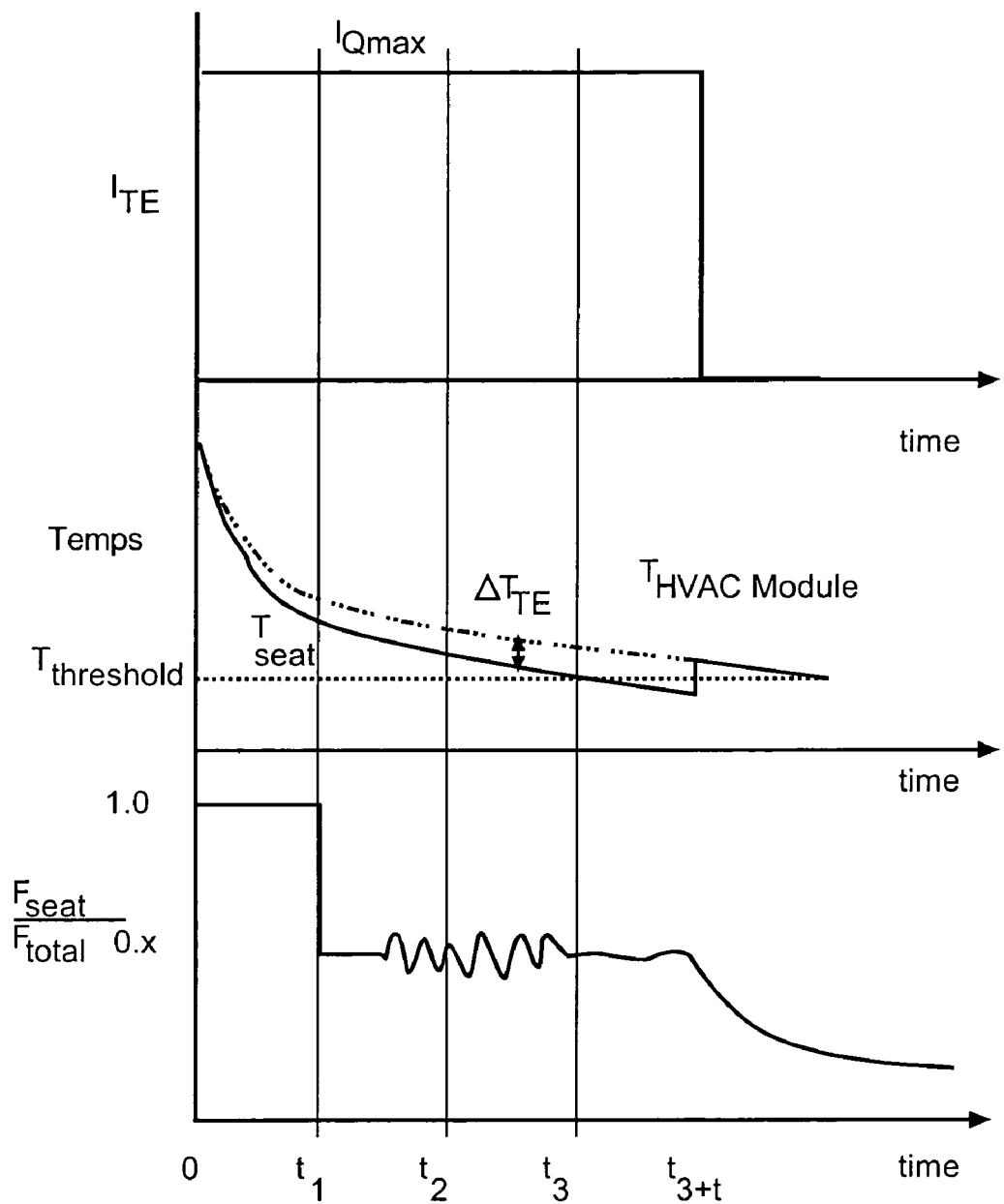
FIG. 5 is a depiction of the cooling algorithm.

The necessary algorithm for cooling the seat assembly 22 is shown in FIG. 5. During initial startup, I is set to $I_{Qmax}$ and the flow to the seat assembly 22 to the total air flow, $F_{seat}/F_{total}=1$, until $\Delta T_{TE}$ begins to increase and Q decrease. At time $t_1$, $F_{seat}/F_{total}$ is then set to a value to maximize Q until such a time that the occupant of the seat assembly 22 is comfortable. This time duration $t_1$-$t_3$ optimizes Q based upon $T_{seat}$ and $\Delta T_{TE}$, utilizing the proportioning valve 42. At some point comfort is reached based upon a thermoelectric outlet air temperature to the seat side 38, $T_{seat}$. At this time further cooling would continue slightly below the comfort temperature, $T_{threshold}$, and then the thermoelectric device 34 would be controlled via the electrical power or current I by using pulse width modulation or decreasing current. Additional control of the seat comfort would be obtained by the proportioning valve 42 closing or opening to obtain the necessary temperature and airflow to the seat ($F_{seat}/F_{total}$). After a certain point, the cool air only from the HVAC module 28 may be enough to supply the necessary cool air to the seat assembly 22. As shown in FIG. 5, $F_{seat}/F_{total}$0=.x represents the optimum airflow at which the thermoelectric device 34 will operate and can be determined for both heating and cooling. The proportioning valve 42 will be utilized to operate the thermoelectric device 34 at the max Q possible by changing $F_{seat}/F_{total}$ throughout the transient cooling.

Figure 6:
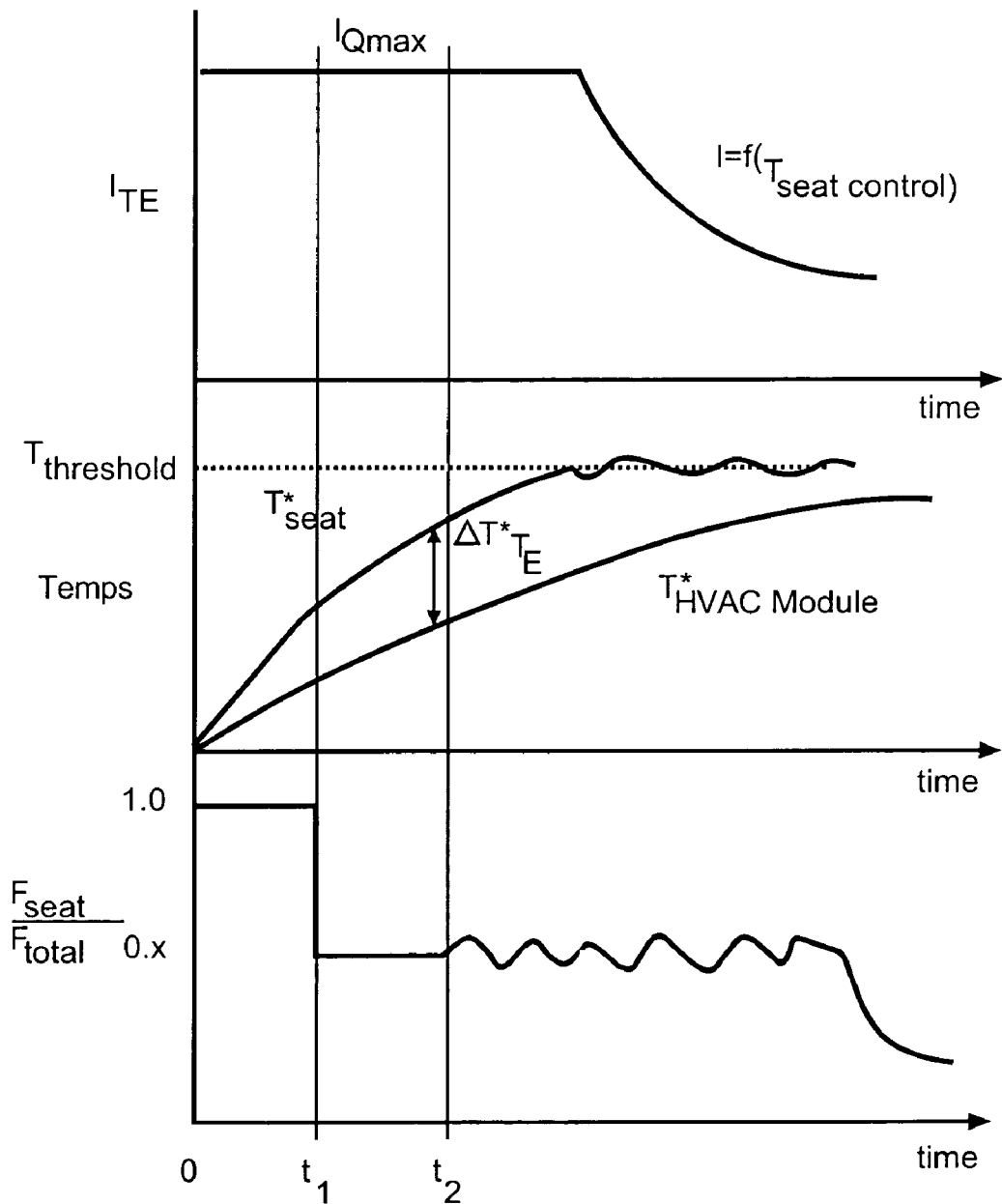
FIG. 6 is a depiction of the heating algorithm.

Similarly, the necessary algorithm for heating the seat assembly 22 is shown in FIG. 6. During initial startup, I is set to $I_{Qmax}$ and $F_{seat}/F_{total}=1$, until $\Delta T_{TE}$ begins to increase and Q decrease. At time $t_1$ the ratio of $F_{seat}/F_{total}$ is then set to a value to maximize Q until such a time that the passenger is comfortable. This time duration $t_1$-$t_2$ optimizes Q based upon $T_{seat}$ and $\Delta T_{TE}$ utilizing the adjustment of the proportioning valve 42. At some point comfort or desired temperature is reached, based upon an outlet air temperature, $T_{seat}$, of the thermo-electric device 34. At this time, further heating would continue slightly above the comfort temperature, $T_{threshold}$, and then the thermoelectric device could be controlled via the current I by using pulse width modulation or decreasing current. Additional control of the seat comfort could be obtained by the proportioning valve 42 closing or opening to obtain the necessary temperature and airflow to the seat assembly 22 ($F_{seat}/F_{total}$). Again, $F_{total}$ is equal to total airflow through the thermoelectric module, and $F_{seat}$ is equal to airflow through conditioned or seat side 38 of thermo-electric device 34 and on to the seat assembly 22.

The proportioning valve 42 is operated to maximize the Q, which is dependent upon the material, i.e., physical characteristics, of the thermo-electric device. Utilizing a look-up table, usually provided with each thermoelectric device 34, the Q can be maximized based upon $\Delta T_{TE}$ and $T_{seat}$. The $\Delta T_{TE}$ can be found utilizing the thermo-electric power S of thermo-electric device 34, which will vary with $\Delta T_{TE}$ for a known thermoelectric material. Therefore, during initial transients, the Q is maximized by utilizing the $\Delta T_{TE}$ and $T_{seat}$ by varying the proportioning valve 42.

Accordingly, the invention provides a method of providing thermally conditioned air to passages in a seat assembly 22 of an automotive vehicle having a HVAC module 28 for supplying heating and cooling air to a cabin vent 26 wherein the method comprises the steps of delivering heating and cooling air from the HVAC module 28 to the seat passages 24 of the seat assembly 22 and/or to the seat assembly 22, and exchanging heat with the heating and cooling air from the HVAC module 28 by an auxiliary heat exchange before delivery to the seat passages 24 of the seat assembly 22. The method includes utilizing electrical power from the vehicle electrical system 36 to drive an auxiliary heat exchange before delivery to the seat passages 24 of the seat assembly 22. The heating and cooling air from the HVAC module 28 is divided or proportioned into a seat side 38 and a cabin side 40. The method is distinguished by adjusting the electrical power to the thermo-electric device 34 in relationship to the proportioning of the heating and cooling air and in response to the temperature difference between the actual temperature of the seat assembly 22 and the desired or control temperature. This is accomplished by sensing the actual temperature $T_{seat}$ of the air directed to the seat side 38, setting a desired or control temperature $T_{control}$ of the seat assembly 22, and comparing and determining the temperature difference $\Delta T$ between the actual temperature $T_{seat}$ and the desired temperature $T_{control}$.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An automotive vehicle comprising;
a body defining a passenger cabin,
a seat assembly disposed in said passenger cabin and having seat passages for thermally conditioning a seat occupant with air,
at least one cabin vent in said vehicle for conveying air into said cabin,
a HVAC module for supplying heating and cooling air,
ductwork for conveying said heating and cooling air from said HVAC module to said cabin vent and to said seat passages of said seat assembly,
a thermo-electric device in said ductwork and having a seat side and a cabin side for heating and cooling air from said HVAC module for delivery to said seat passages of said seat assembly,
an electrical system for supplying electrical power and wherein said thermo-electric device connected electrically to said electrical system for receiving electrical power therefrom,
a proportioning valve in said ductwork movable to various adjusted positions for proportioning air between said seat side and said cabin side of said thermo-electric device from said HVAC module,
said vehicle characterized by a controller for adjusting said proportioning valve and for adjusting said electrical power to said thermo-electric device in relationship to one another.

2. An automotive vehicle comprising;
a body defining a passenger cabin,
a seat assembly disposed in said passenger cabin and having seat passages for thermally conditioning a seat occupant with air,
at least one cabin vent in said vehicle for conveying air into said cabin,
a HVAC module for supplying heating and cooling air,
ductwork for conveying said heating and cooling air from said HVAC module to said cabin vent and to said seat passages of said seat assembly,
a thermo-electric device in said ductwork and having a seat side and a cabin side for heating and cooling air from said HVAC module for delivery to said seat passages of said seat assembly,
an electrical system for supplying electrical power and wherein said thermo-electric device connected electrically to said electrical system for receiving electrical power therefrom,
a proportioning valve in said ductwork movable to various adjusted positions for proportioning air between said seat side and said cabin side of said thermo-electric device from said HVAC module,
a sensor for sensing the actual temperature of said seat assembly,
a selector for setting a desired temperature of the seat assembly,
a differentiator for determining the temperature difference between said actual temperature and said desired temperature,
said vehicle characterized by a controller for adjusting said proportioning valve and for adjusting said electrical power to said thermo-electric device in relationship to one another in response to said temperature difference.

3. An automotive vehicle as set forth in claim 2 wherein said ductwork includes a seat duct for conveying air from said seat side to said seat passages and a cabin duct for conveying air form said cabin side to said cabin.

4. A system for heating and cooling air from an HVAC module in a vehicle for delivery to seat passages of a seat assembly in the vehicle, said system comprising;
a thermo-electric device having a seat side and a cabin side for heating and cooling air from the HVAC module for delivery to the seat passages of the seat assembly in a vehicle and for delivery to the cabin of a vehicle,
a proportioning valve movable to various adjusted positions for proportioning air between said seat side and said cabin side of said thermo-electric device, said system characterized by a controller for adjusting said proportioning valve and for adjusting said electrical power to said thermo-electric device in relationship to one another.

5. A system for heating and cooling air from an HVAC module in a vehicle for delivery to seat passages of a seat assembly in the vehicle, said system comprising;
   a thermo-electric device having a seat side and a cabin side for heating and cooling air from the HVAC module for delivery to the seat passages of the seat assembly in a vehicle and for delivery to the cabin of a vehicle,
   a proportioning valve movable to various adjusted positions for proportioning air between said seat side and said cabin side of said thermo-electric device,
   a sensor for sensing the actual temperature of said seat assembly,
   a selector for setting a desired temperature of the seat assembly,
   a differentiator for determining the temperature difference between said actual temperature and said desired temperature,
   said system characterized by a controller for adjusting said proportioning valve and for adjusting said electrical power to said thermo-electric device in relationship to one another in response to said temperature difference.

6. A system for heating and cooling air from an HVAC module in a vehicle for delivery to seat passages of a seat assembly in the vehicle, said system comprising;
   a thermo-electric device having a seat side and a cabin side for heating and cooling air from the HVAC module for delivery to the seat passages of the seat assembly in a vehicle and for delivery to the cabin of a vehicle,
   a proportioning valve movable to various adjusted positions for proportioning air between said seat side and said cabin side of said thermo-electric device,
   a sensor for sensing the actual temperature of said seat assembly,
   a selector for setting a desired temperature of the seat assembly,
   a differentiator for determining the temperature difference between said actual temperature and said desired temperature,
   said system characterized by a controller for adjusting said proportioning valve to maximize the power of the thermo-electric-device in accordance with;

$$I_Q = \frac{ST_C}{R}. \tag{3}$$

7. A method of providing thermally conditioned air to passages in a seat assembly of an automotive vehicle having a HVAC module for supplying for supplying heating and cooling air to a cabin, said method comprising the steps of;
   delivering heating and cooling air from the HVAC module to the seat passages of the seat assembly,
   exchanging heat with the heating and cooling air from the HVAC module by utilizing electrical power from the vehicle electrical system to drive an auxiliary heat exchange in a thermo-electric device before delivery to the seat passages of the seat assembly,
   proportioning the heating and cooling air from the HVAC module into a seat side and a cabin side,
   sensing the actual temperature of the air directed to the seat side,
   setting a desired temperature of the seat assembly,
   determining the temperature difference between the actual temperature and the desired temperature,
   adjusting the electrical power to the thermo-electric device in relationship to the proportioning of the heating ($T_H$) and cooling ($T_C$) air and in response to the temperature difference, and
   proportioning the heating and cooling air to maximize the power of the thermo-electric-device in accordance with;

$$I_Q = \frac{ST_C}{R}. \tag{3}$$

8. A method as set forth in claim 7 wherein the adjusting of the electrical power is further defined as being also in response to the temperature difference between the actual temperature of the air directed to the seat side and the desired temperature of the seat assembly.

9. A method of providing thermally conditioned air to passages in a seat assembly of an automotive vehicle having a HVAC module for supplying heating and cooling air to a cabin, said method comprising the steps of;
   delivering heating and cooling air from the -HVAC module to the seat passages of the seat assembly,
   exchanging heat with the heating and cooling air from the HVAC module by utilizing electrical power from the vehicle electrical system to drive an auxiliary heat exchanger in a thermoelectric device before delivery to the seat passages of the seat assembly,
   proportioning the heating and cooling air from the HVAC module into a seat side and a cabin side, and
   adjusting the electrical power to the thermo-electric device in relationship to the proportioning of the heating and cooling air into the seat side and the cabin side.

* * * * *